Dec. 26, 1950 D. L. MARKUSEN 2,535,147

ELECTRONIC CONTROL CIRCUITS

Filed May 29, 1948 3 Sheets-Sheet 1

Inventor
DAVID L. MARKUSEN

By

George H. Fisher
Attorney

Inventor
DAVID L. MARKUSEN

By

George H. Fisher
Attorney

Inventor
DAVID L. MARKUSEN

By

George H. Fisher
Attorney

Patented Dec. 26, 1950 2,535,147

UNITED STATES PATENT OFFICE 2,535,147

ELECTRONIC CONTROL CIRCUITS

David L. Markusen, Minneapolis, Minn., assignor to Minneapolis-Honeywell Regulator Company, Minneapolis, Minn., a corporation of Delaware Application May 29, 1948, Serial No. 30,130

17 Claims. (Cl. 315—201)

The present invention relates to a general purpose type of electronic control circuits and in particular to control circuits having a discriminator output. It is an object of this invention to provide an improved control circuit of the type in which a signal voltage is impressed upon an impedance network so as to selectively operate one and only one tube in the output stage.

Another object of the invention is to provide such a circuit having an impedance network which will operate to cause one of the tubes in the output stage to start firing as the input voltage changes such that the other tube ceases firing.

Another object of the invention is to provide such a control circuit which will be selectively operative over a large range of signal values.

Another object of the invention is to provide such a control circuit which will discriminate against out of phase signal inputs.

Another object of the invention is to provide such a control circuit in which either gas tubes or vacuum tubes can be used in the output stage.

Another object of the invention is to provide a control circuit in which the signal and bias inputs can be interchanged.

The features of the invention which I believe to be novel are set forth with particularity in the appended claims. The invention itself, however, both as to its organization and method of operation, together with further objects and advantages thereof, may best be understood by reference to the following description taken in connection with the accompanying drawings, in which:

Figure 1:
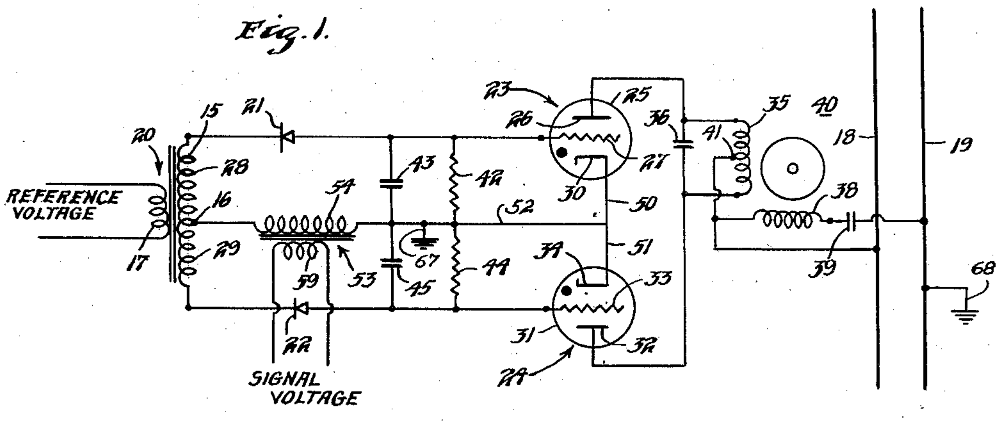
Figure 1 is a circuit diagram showing one form of the invention.

In the modification shown in Figure 1, a reference voltage is shown impressed into the circuit through a transformer 20 having a primary 17 and a secondary winding 15 composed of an upper half 28 and a lower half 29 having a center-tap 16 therebetween. Though not shown the reference voltage may be connected to power leads 18 and 19. This voltage is then sent to rectifiers 21 and 22 and impressed upon the grids of the thyratron tubes 23 and 24. Tube 23 is shown to have an envelope 25, plate 26, grid 27, and cathode 30. Tube 24 has an envelope 31, plate 32, grid 33, and cathode 34. The plates of the two tubes 23 and 24 are in phase and are fed from an alternating line voltage source indicated by power lines 18 and 19 through two halves of a winding 35 of motor 40. Cathodes 30 and 34 are connected to the voltage source through ground terminals 67 and 68.

Motor 40 is a reversible motor having two windings 35 and 38 ninety degrees out of phase with each other. Winding 35 has a condenser 36 in parallel therewith and winding 38 has a condenser 39 in series therewith. Winding 38 and condenser 39 are connected across power lines 18 and 19 and a center tap 41 on winding 35 is connected to the same power lead as is the terminal of winding 38 opposite condenser 39.

A resistance 42 and a condenser 43 are electrically connected between grid 27 and cathode 30 of tube 23. A resistance 44 and a condenser 45 are electrically connected between grid 33 and cathode 34 of tube 24. Cathodes 30 and 34 are electrically connected through leads 50 and 51 and from there to ground through lead 52. A signal voltage is shown impressed into the circuit between center tap 16 on the secondary 15 of transformer 20 and ground through a transformer 53 having a primary 59 and a secondary 54.

The operation of this circuit is as follows:

A zero signal input will first be assumed.

At that half cycle when the upper end of the secondary 15 of transformer 20 is negative with respect to the lower end, the right side of rectifier 21 will be positive with respect to the left side and the rectifier 21 will conduct. Current will then flow through a completed circuit from the center tap 16 of the secondary 15 of transformer 20, secondary 54 of transformer 53, condenser 43, rectifier 21 and upper half 28 of secondary winding 15. This will cause condenser 43 to charge up so that the top plate will be negative with respect to the bottom plate. At the same time that condenser 43 is charging up a current will be passing through resistor 42 in such a manner that the upper end of resistance 42 will be negative with respect to the lower end. As a result the grid 27 of tube 23 will be driven negative with respect to the cathode 30.

Upon the next half cycle, while rectifier 21 is not conducting, condenser 43 will discharge through resistance 42 to keep the upper end of resistance 42 negative with respect to the lower end. As a result grid 27 is held negative with respect to cathode 30 during the entire cycle. With the proper values of resistance and capacitance for resistor 42 and condenser 43 the grid 27 will be held below cut off so that tube 23 will not fire during any portion of the cycle.

Upon that half cycle when the lower end of the secondary 15 of transformer 20 is negative with respect to the upper end rectifier 22 will conduct and a completed circuit will permit current to pass from the center tap 16 of the transformer secondary 15 of transformer 20 through secondary 54 of the signal voltage transformer 53, condenser 45 and resistance 44, rectifier 22, and lower half 29 of secondary winding 15. Current will flow through resistance 44 in such a manner that the bottom end of resistance 44 will be negative with respect to the upper end and thus hold grid 33 negative with respect to the cathode 34 in tube 24. At the same time condenser 45 will charge up in such a manner that the bottom plate will be negative with respect to the upper plate.

Figure 2:
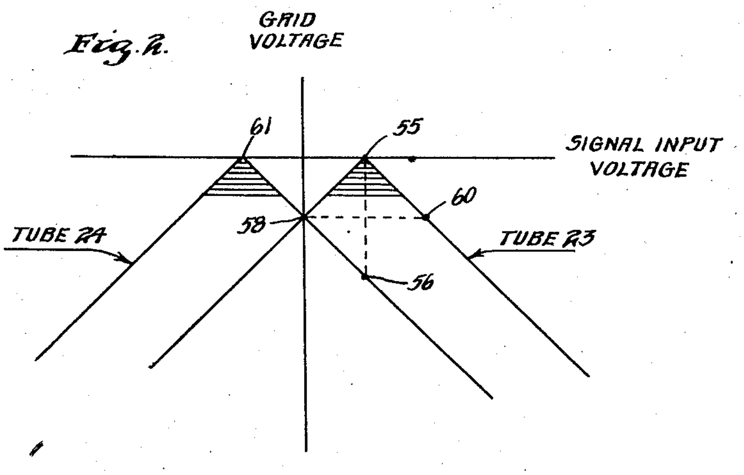
Figure 2 is a graph showing the operating characteristics of the circuit shown in Figure 1.

Upon the following half cycle when rectifier 22 will not conduct condenser 45 discharges through resistance 44 and keeps the grid 33 negative with respect to cathode 34. With proper resistance and capacitance values for resistance 44 and condenser 45 the grid 33 of tube 24 will remain below cut-off during the entire cycle. With equal resistance values for resistances 42 and 44 and equal capacitance values for condensers 43 and 45 the grid voltage on each tube will be the same. The graph in Figure 2 shows this condition at point 58 wherein no signal voltage is present. It will be noted that the reference voltage impressed across transformer primary 17 operates to bias the grids 27 and 33 negative with respect to cathodes 30 and 34 respectively.

The next case assumed will be that in which a small signal voltage is impressed into the circuit and has such polarity that when the upper end of the transformer secondary 15 of transformer 20 is negative with respect to its lower end, the right end of transformer secondary 54 of transformer 53 will be negative with respect to its left end. On this half cycle the voltage difference between the upper end of the upper half 28 of the transformer secondary 15 and the right end of transformer secondary 54 will be less than in the previous case but will still have such polarity across rectifier 21 that the rectifier will conduct. Thus the completed circuit will cause current to flow from center tap 16 of transformer secondary 15 through transformer secondary 54, condenser 43 and resistance 42, rectifier 21 and winding portion 28. The upper end of resistance 42 will still be negative with respect to the bottom end but grid 27 will not now be as negative with respect to cathode 30 as before. This portion of the grid voltage curve of tube 23 is between the points 58 and 55 on the tube 23 curve of Figure 2 and it will be seen that when the signal voltage becomes sufficiently great tube 23 will fire.

The voltage induced in secondary 54 will add to the voltage induced in the lower half 29 of the transformer secondary 15 so that upon that half cycle when the bottom end of transformer portion 29 is negative with respect to the upper end of transformer portion 29 rectifier 22 will conduct and current will pass through resistance 44 and also charge up condenser 45 to a higher value than before. On the next half cycle condenser 45 will discharge through resistance 44 driving the lower end of resistance 44 more negative with respect to the upper end. This drives the grid 33 more negative with respect to cathode 34 than before. This portion of the grid voltage curve of tube 24 is between the points 58 and 56 on the tube 24 curve of Figure 2.

When the signal voltage becomes equal to the bias voltage impressed across half of the secondary 15 and the phasing remains the same there will be no voltage across rectifier 21 nor will any current pass through resistance 42. Thus the grid 27 will then be at the same potential as cathode 30 of tube 23. A positive voltage on plate 26 of tube 23 will cause the tube to conduct. The voltage across rectifier 22 will be further increased and as a result grid 33 will be driven still more negative with respect to cathode 34. At this point the voltages on the two grids 27 and 33 are represented on the graph of Figure 2 as points 55 and 56 respectively.

Upon a still greater signal voltage being induced in transformer secondary 54, the phasing remaining the same, the voltage across transformer secondary 54 will be greater than the voltage induced in the upper portion 28 of the transformer secondary of the transformer 20 and as a result the rectifier 21 will conduct on that half cycle when the left end of transformer secondary 54 is negative with respect to the right end. Condenser 43 will charge up with the upper plate negative with respect to the lower plate and upon the next half cycle will discharge through resistance 42 in such a manner that the grid 27 will again be driven negative with respect to cathode 30. From this it can be seen that by the time the signal voltage is twice as large as the bias voltage induced in each portion 28 and 29 of the secondary 15 tube 23 will again have its grid 27 driven below cut-off, and the potential on grid 27 will be the same as at no signal. This point is represented on the tube 23 curve of Figure 2 as point 60.

When the polarity of the signal induced in transformer secondary 54 is of opposite phase than in the examples already described, increased signal voltage will cause the grid 33 of tube 24 to become less negative with respect to cathode 34 until it is at the same potential as cathode 34, indicated at point 61, and then to move negative again with respect to cathode 34 so that tube 24 will be moved into, and then out of, the firing range.

As can be seen from the drawings and from the explanation already given, when the reference voltage is impressed into the circuit in the position shown in Figure 1 the condensers 43 and 45 will be charged up on opposite half cycles. As a result, the "ripple" voltage on the grids 27 and 33 of tubes 23 and 24 due to the charging and discharging of condensers 43 and 45 will be 180° out of phase with each other. When the reference voltage and signal voltage inputs are interchanged in the circuit shown in Figure 1 the ripple voltages on the grids of tubes 23 and 24 are in phase. This is because the rectifiers 21 and 22 conduct during the same half cycle and thus the condensers 43 and 45 charge up during the same half cycle. When a signal voltage is present the ripple voltage curve for the grid of one of the tubes decreases both in amplitude and in swing, that is, the difference between the charge and discharge voltages. At the same time the ripple voltage curve for the grid of the other tube increases both in amplitude and in swing. When the signal becomes greater than the reference voltage the phase relationship of the ripple voltages will be changed. That is, for the circuit as shown in Figure 1, a signal voltage greater than half the total reference voltage will cause the ripple voltages on the two grids to be in phase. In the case where the signal voltage and the reference voltage are interchanged a total signal voltage greater than twice the reference voltage will cause the ripple voltages on the grids of the two tubes to change from in phase to 180° out of phase.

The circuit shown in Figure 1 also discriminates against signal voltages out of phase with the reference voltage just as is done by other discriminator circuits.

A disadvantage of the circuit shown in Figure 1 is that the operating range of the tubes 23 and 24 does not extend over a wide range of signal input voltage.

Figure 3:
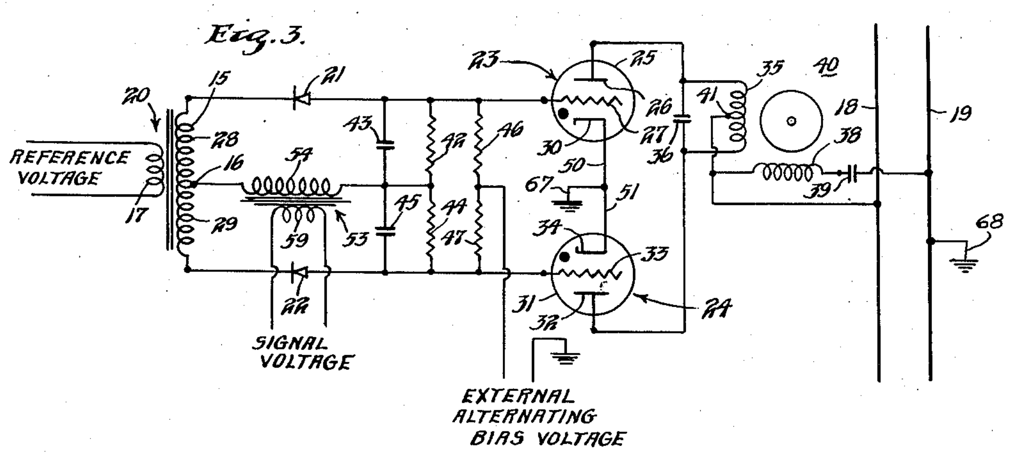
Figure 3 is a circuit diagram showing a modification of the invention.

*Modification in Figure 3*

The modification shown in Figure 3 overcomes the objection found in the circuit in Figure 1. The circuit in Figure 3 is essentially the same as that shown in Figure 1 with the exception that two resistances 46 and 47 have been added and the right hand terminal of transformer secondary 54 is not connected to cathodes 30 and 34. The two resistances 46 and 47 are connected in series and are electrically connected into the circuit between the grids 27 and 33 of tubes 23 and 24 respectively. An external alternating bias voltage has also been added and is connected into the circuit between the junction of resistors 46 and 47 and ground.

Though superficially the appearance of the circuit shown in Figure 3 is quite similar to that shown in Figure 1 the operation of the two are quite different. Because there is no connection between the cathodes 30 and 34 and the reference voltage transformer 20 the reference voltage transformer can in no way operate to put a bias between the grids and cathodes of the tubes. As a result, in order to prevent the tubes 23 and 24 from firing when no signal is present, it is necessary to impress into the circuit an alternating bias voltage. Though no connection is shown the bias voltage may be obtained from power leads 18 and 19 through a step down transformer. It is to be understood that a direct voltage bias may be impressed in place of the alternating bias voltage indicated without changing the characteristics of the circuit.

The operation of the circuit in Figure 3 is as follows.

It will first be assumed that no signal voltage is present. It will also be assumed that on that half cycle when the upper end of the secondary 15 of transformer 20 is negative with respect to its lower end the plates 25 and 32 of tubes 23 and 24 will be positive with respect to cathodes 30 and 34 respectively. On the half cycle when the upper end of the secondary 15 of transformer 20 is negative with respect to the lower end the voltage across rectifier 21 will be of the proper polarity to permit rectifier 21 to conduct. Thus a completed circuit will permit current to flow from the center tap 16 of the secondary 15 of transformer 20 through transformer secondary 54, condenser 43, rectifier 21 and secondary portion 28. Current will also flow through resistance 42 in parallel with condenser 43 and through resistances 44, 47 and 46, also in parallel with condenser 43.

On the next half cycle the polarity of the voltage across rectifier 22 will be such as to permit rectifier 22 to conduct. Thus a completed circuit will permit current to flow from center tap 16, through transformer secondary 54, condenser 45, recifier 22 and secondary portion 29. Current will also flow through resistance 44 in parallel with condenser 45 and through resistances 42, 46 and 47.

Figure 4:
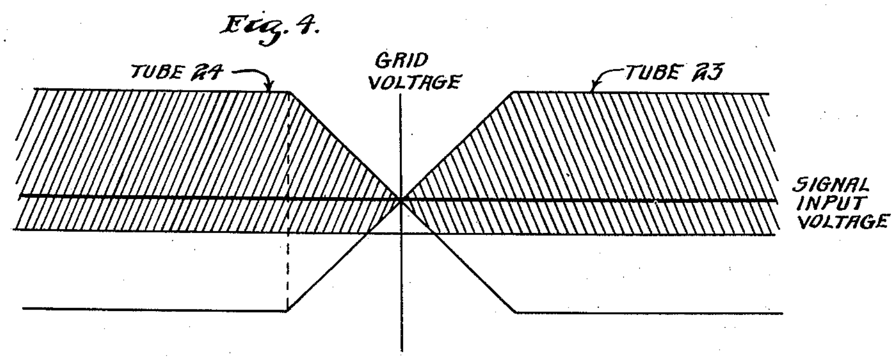
Figure 4 is a graph showing the operating characteristics of the circuit shown in Figure 3 when not using an external bias.
Figure 5:
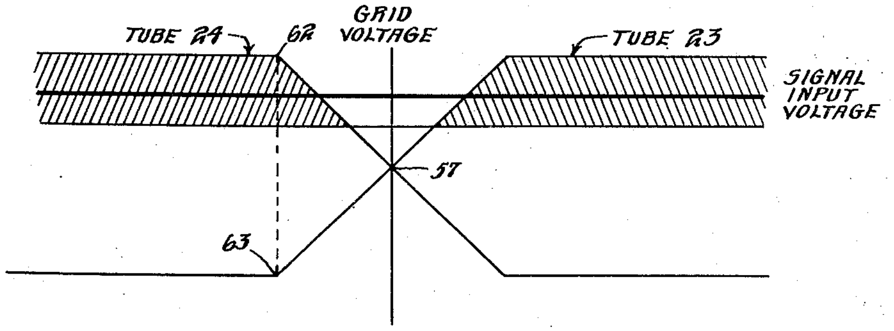
Figure 5 is a graph showing the operating characteristics of the circuit shown in Figure 3 when using an external bias.

On the following half cycle condenser 45 will discharge through resistance 44 and through resistances 42, 46 and 47. With the voltage induced in secondary portion 28 equal to that voltage induced in secondary portion 29 of transformer 20, the capacitance of condenser 43 equal to the capacitance of condenser 45, resistor 42 equal to resistor 44, resistor 46 equal to resistor 47 and no external bias, the current flowing through resistors 46 and 47 from the secondary portions 28 and 29 and the discharging of condensers 43 and 45 reduces the voltage drop across resistances 46 and 47 to zero and the grids 27 and 33 of tubes 23 and 24 are at the same potential as cathodes 30 and 34 and the tubes fire This is shown in the graph in Figure 4. When an external alternating bias voltage having such phase that the grids are driven negative during the same half cycle that the plates are positive with respect to the cathodes is added as shown in Figure 3 the grids of the two tubes are driven sufficiently negative with respect to their cathodes so that the tubes do not fire. This potential is entirely due to the external bias and is shown in the graph in Figure 5 at point 57. By making use of the alternating bias voltage the bias on the grids of the tubes on the opposite half cycle would be positive with respect to the cathodes but because the plates would be negative with respect to the cathodes on this portion of the cycle the tubes would be nonconducting. The graph in Figure 5 has been drawn to show the negative bias placed on the grids at the peak value.

When a small signal is added and is of such polarity that the left end of transformer secondary 54 is negative with respect to the right end when the upper portion of transformer secondary portion 28 is negative with respect to the lower portion the voltage across rectifier 21 will be increased and the condenser 43 will charge up to a higher value than before. The upper plate of condenser 43 will be negative with respect to the bottom plate. Current will also go through resistances 47 and 46 in such a manner that the bottom ends of resistances 47 and 46 will be positive with respect to the upper ends.

The voltages in transformer secondary 54 and transformer secondary portion 29 will oppose each other and the voltage across the plates of condenser 45 will accordingly be less than at zero signal. Current will also flow through resistances 46 and 47 in such a manner that the upper ends of resistances 46 and 47 will be positive with respect to the lower ends. The voltage drop produced by the addition of the voltages across transformer secondary 54 and transformer secondary portion 28 and the subsequent discharging of condenser 43 on the following half cycle through resistances 46 and 47 will be greater than the voltage drop produced by the voltage difference between transformer secondary 54 and transformer secondary portion 29 and the subsequent discharge from condenser 45 through the same resistors. As a result grid 33 of tube 24 will be less negative with respect to the cathode 34 than it was at zero signal. With sufficient signal, therefore, the grid 33 of tube 24 will be brought above cut off potential and tube 24 will fire. As was stated before, the upper end of resistance 46 will be driven negative with respect to its lower end and as a result grid 27 of tube 23 will be driven more negative with respect to the cathode 30.

The voltage differences between the grids and cathodes of tubes 23 and 24 will continue to change until the voltage induced in transformer secondary 54 is equal to the voltage induced in each of the secondary portions 28 and 29 of transformer 20. At this point, shown in Figure 5 as points 62 and 63 on the curves of tube 24 and tube 23 respectively, the signal voltage will predominate and the voltage across condenser 43 when fully charged will be the signal voltage minus the reference voltage induced in transformer secondary 28 and the voltage across condenser 45 will be the signal voltage minus the reference voltage induced in secondary portion 29. Obviously this will result in a constant voltage across the resistances 46 and 47 which is the voltages in secondary portions 28 and 29 added together and impressed across resistances 46 and 47 in such a manner that the bottom ends of resistances 46 and 47 will be positive with respect to the upper ends. The voltage between cathode and grid in each tube will then be that reference voltage found in half of the secondary 15 of transformer 20 added algebraically to the bias voltage.

If the polarity of the voltage induced in transformer secondary 54 is reversed, an increased signal voltage increases the charge on condenser 45 and decreases the charge on condenser 43 and the result is that the upper ends of resistors 46 and 47 are positive with respect to the bottom ends and tube 23 moves into the firing range as tube 24 moves out.

The reference voltage and the signal voltage can be interchanged in this circuit. The only effective change will be that the signal voltage must become equal to twice the reference voltage before the voltage on the grid of each tube becomes constant. In the arrangement shown in Figure 3 it is only necessary for the signal voltage to become equal to half the total reference voltage for the grid voltages to become constant.

The only operation of the external alternating bias voltage is to keep the grids 27 and 33 of tubes 23 and 24 at a constantly more negative value than would be the case were the external alternating bias voltage not used. With this exception, the operation of the circuit with or without the external alternating bias voltage is the same.

A disadvantage of this circuit is that in order to prevent both tubes from firing at the same time at zero signal and at very small signals it is necessary to include the external bias voltage.

This circuit will discriminate against out of phase signals in the same manner as the circuit in Figure 1. The ripple voltages on the grids of the output stage of this circuit are the same as for the circuit shown in Figure 1. That is, when the reference voltage and signal voltage are positioned in the circuit as shown in Figure 3, for zero signals or signals less than the reference voltage induced in each half 28 and 29 of the secondary 15 of transformer 20 the condensers 43 and 45 will charge up out of phase and the ripple voltages on the grids 27 and 33 of tubes 23 and 24 will be out of phase. When the signal voltage becomes greater than that portion of the reference voltage induced in each of the secondary halves 28 and 29 the rectifiers 21 and 22 will conduct on the same half cycle and condensers 43 and 45 will then charge up on the same half cycle. As a result the phasing of the ripple voltages on control electrodes 27 and 33 of tubes 23 and 24 will be the same. When the reference voltage and the signal voltage are interchanged in the circuit in Figure 3 the reverse is true. That is, at zero signal or signals smaller than twice the reference voltage, the rectifiers 21 and 22 will conduct on the same half cycle and condensers 43 and 45 will charge up simultaneously. The ripple voltages on grids 27 and 33 of tubes 23 and 24 will then be the same. When the signal voltage becomes twice the reference voltage the rectifiers 21 and 22 will conduct on opposite half cycles and the condensers 43 and 45 will charge up out of phase. As a result the ripple voltages on grids 27 and 33 will be out of phase. As was described previously the ripple voltage curve for one of the tubes will go less negative and the ripple voltage curve for the other tube will go more negative upon increased signal voltage of a particular phase.

Figure 6:
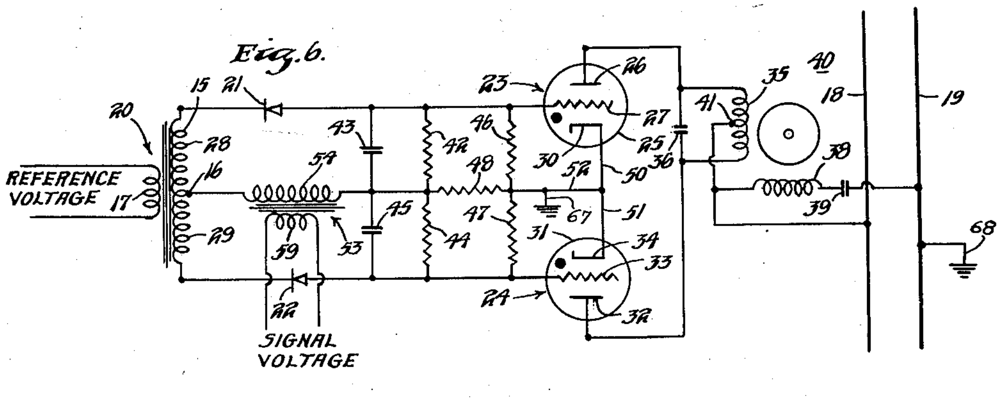
Figure 6 is a circuit diagram showing a preferred modification of the invention.

*Modification of Figure 6*

Another modification of the circuit is shown in Figure 6. This circuit is quite similar to the one shown in Figure 3. This one, however, does not have an external alternating bias voltage between the junctions of resistances 46 and 47 and the cathodes 30 and 34 of tubes 23 and 24. In addition, a resistance 48 is placed between the junction of resistances 42 and 44 and the junction of resistances 46 and 47.

In explaining the operation of this circuit it will again be assumed that the plates 26 and 32 of tubes 23 and 24 are positive on that half cycle when the upper ends of the secondary halves 28 and 29 of transformer 20 are negative with respect to the bottom ends.

A zero signal will first be assumed. In this case when the upper end of portion 28 of transformer 20 is negative with respect to the bottom end the polarity across rectifier 21 will be such that the rectifier will conduct. A completed circuit will then permit current to flow from center tap 16, through secondary 54, condenser 43, rectifier 21 and upper portion 28. Current will also flow through the following circuits which are parallel with condenser 43: resistance 42; resistances 48 and 46; and resistances 44, 47 and 46. To begin with it will be assumed that resistances 42, 44, 46, 47 and 48 all have the same value. Thus it will be seen that the current flowing through resistance 46 is greater than that current flowing through resistance 47, the current in each case being that due to the voltage induced in transformer secondary half 28. As a result the secondary portion 28 of transformer 20 will drive grid 27 more negative with respect to the cathode 30 in tube 23 than it will drive grid 33 positive with respect to cathode 34 of tube 24. On the following half cycle, the polarity of the voltage across rectifier 22 due to the voltage induced in transformer secondary half 29 will be such that rectifier 22 will conduct and a completed circuit will allow current to flow from center tap 16 through secondary 54, condenser 45, rectifier 22 and portion 29. Current will also flow through the following circuits which are parallel to condenser 45: resistance 44; resistances 48 and 47; and resistances 42, 46, and 47. It will be seen that the current flowing in resistance 47 is greater than that current flowing in resistance 46 the current in each case being that due to the voltage induced in transformer secondary portion 29. Transformer secondary 29 induces a voltage across resistance 47 just as great as that voltage induced across resistance 46 by transformer secondary portion 28. This voltage induced by transformer secondary portion 29 across grid 33 and cathode 34 of tube 24 and which drives grid 33 negative is greater than that voltage impressed across grid 33 and cathode 34 of tube 24 by transformer secondary portion 28 which is of such polarity as to drive the grid 33 positive. Thus the net voltage between grid 33 and cathode 34 drives the grid 33 negative with respect to the cathode 34. The voltage due to transformer secondary portion 28 impressed across resistance 46 is of such polarity as to drive the grid 27 negative with respect to its cathode 30 of tube 23 and is greater than that voltage due to transformer secondary 29 impressed across resistance 46 which is of such polarity as to drive grid 27 positive with respect to the cathode 30. Thus the net voltage across grid 27 and cathode 30 is such as to drive grid 27 negative with respect to cathode 30. When the proper values of constants are chosen these net voltages across the grids and cathodes of the two tubes 23 and 24 are sufficient to drive the grids below cut off. The graph in Figure 8 indicates the bias on the grids of tubes 23 and 24 at zero signal by the point $E_{G_H}$.

When a small signal impressed through transformer 53 and induced in transformer secondary 54 is of such polarity that the left end of transformer secondary 54 is negative with respect to the right end at the same portion of the cycle that the upper end of transformer secondary half 28 is negative with respect to the bottom end of transformer secondary half 28 the two voltages will add. With the phasing just described, the voltages induced in transformer secondary half 29 and transformer secondary 54 will subtract.

At that half cycle when the upper end of transformer secondary portion 28 and the left end of transformer secondary 54 are negative with respect to their bottom and right ends respectively, rectifier 21 conducts and builds up a charge on condenser 43 larger than that charge built up when no signal is present. A larger voltage is also impressed across resistances 46 and 47. The polarity of the voltages impressed across these two resistances 46 and 47 is such as to drive control element 27 more negative with respect to cathode 30 in tube 23 and to drive control element 33 in a positive direction with respect to cathode 34 in tube 24.

Figures 7, 8:
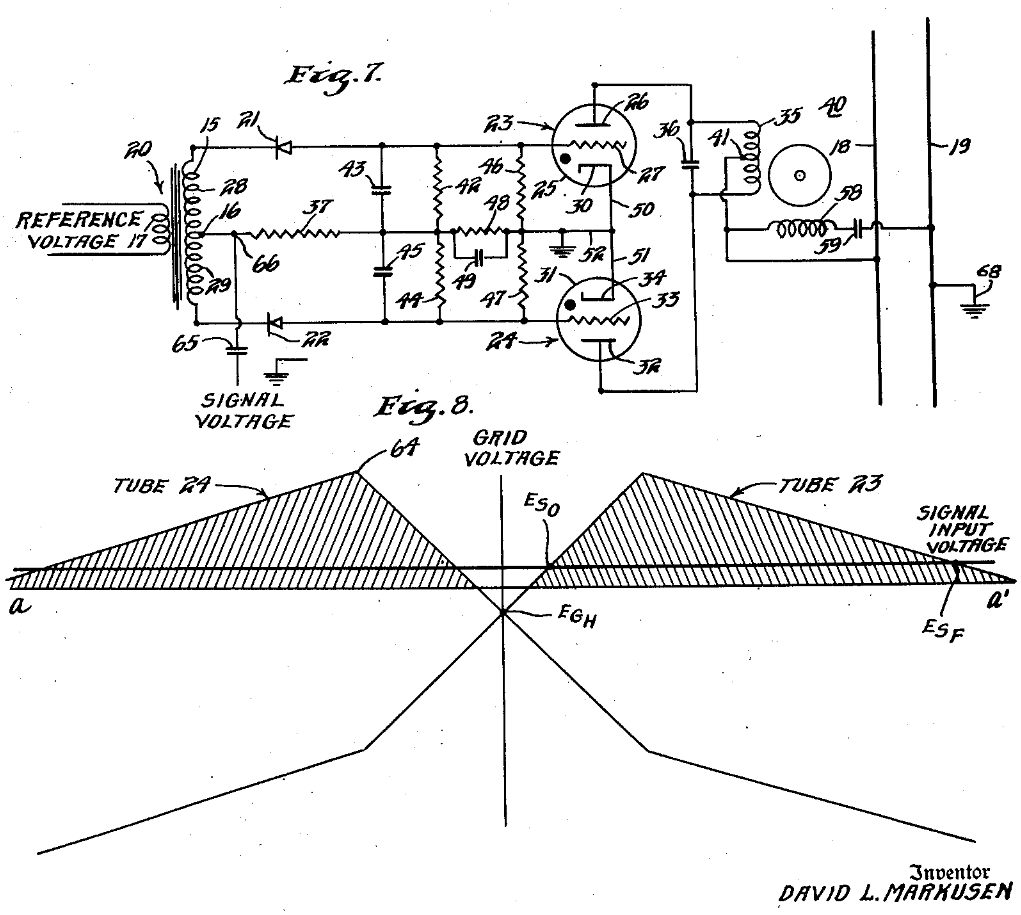
Figure 7 is a circuit diagram showing another preferred modification of the invention.
Figure 8 is a graph showing the operating characteristics of the circuits shown in Figures 6 and 7.

On the following half cycle when rectifier 22 conducts a smaller voltage is built up across condenser 45 than is on the condenser when no signal is present. Also, a smaller voltage is impressed across resistances 46 and 47. The voltages induced by transformer secondary portion 29 across resistances 46 and 47 is of opposite polarity to that voltage impressed across the resistances 46 and 47 by transformer secondary portion 28. The voltage across resistance 47 due to transformer secondary portion 28 plus that voltage induced in transformer secondary 54 will be increasing and with increased signal will equal and then become greater than that voltage impressed across resistance 47 due to the reference voltage induced in transformer secondary portion 29 minus the signal voltage induced in transformer secondary 54. As a result the grid 33 will be driven positive with respect to cathode 34 and tube 24 will conduct. This condition is indicated in the graph of Figure 8 by that portion of the curve of tube 24 between $E_{G_H}$ and 64.

The voltage across resistance 46 continues to become greater with increased signal voltage and drives the grid 27 more negative with respect to cathode 30 of tube 23 while the grid voltage on tube 24 increases with increased signal voltage until the signal voltage becomes equal to half of the total reference voltage induced in the secondary 15 of transformer 20. An increased signal voltage after the signal voltage reaches a value equal to half of total reference voltage reduces the grid voltage in tube 24. This is shown in Figure 8 by that portion of the curve of tube 24 to the left of numeral 64. At this time the rectifiers 21 and 22 conduct on the same half cycle. The voltages charging up condensers 43 and 45 continue to change but they are now both increasing at the same rate. Therefore, the voltage difference between the voltage charging up condenser 43 and the voltage charging up condenser 45 remains constant with continued increased signal. As the voltage across condenser 45 has more effect on the potential across resistance 47 than does the voltage across condenser 43, due to the shorter resistance path which the current from condenser 45 must flow through, the increased voltage across the plate of condenser 45 has greater effect upon the potential across resistance 47 than does the increased voltage across the plates of condenser 43. As a result the grid voltage between grid 33 and cathode 34 of tube 24 slowly decreases until a sufficiently large signal drives the grid 33 of tube 24 below cut-off and the tube 24 stops conducting. This condition is not shown in Figure 8 but occurs when the portion of the curve of tube 24 left of numeral 64 crosses the line *a—a'* which indicates the cut-off voltage.

The voltage across resistance 46 continues to increase but as the difference in voltages on the condenser 43 and condenser 45 is now constant the rate of increase of voltage across resistance 46 is no longer as rapid as formerly, but rather falls off at the same rate as does the voltage across resistance 47.

Obviously, the effect of the voltage induced in transformer secondary portion 29 would be the same on the voltage across resistance 46 and the resultant grid to cathode bias in tube 23 as is the effect of the voltage induced in transformer secondary portion 28 on the voltage across resistance 47 heretofore described.

If the value of resistance 48 is decreased, the value of resistances 42, 44, 46 and 47 remaining constant, the voltage induced in transformer secondary portion 28 and the voltage being discharged from across condenser 43 will have less and less effect upon the potential across resistance 47 until such time as the value of resistance 48 becomes a short circuit path for the current and thus by-passes resistances 44 and 47. In this ultimate case the action of this circuit shown in Figure 6 would be the same as that circuit of Figure 1.

If the value of resistance 48 were to increase, the voltage induced in transformer secondary portion 28 and the voltage discharged from across condenser 43 would have more and more effect upon the potential across resistance 47 until such time as resistance 48 should become infinite in value. In the same manner, the voltage induced in transformer secondary portion 29 and the voltage discharged from across condenser 45 would have increased effect upon the potential across resistance 46 with an increase in value of resistance 48 until such time as resistance 48 should become infinite in value. At that time the action of this circuit in Figure 6 would be the same as the action of the circuit in Figure 3 with the exception of the action of the external alternating bias voltage which has been impressed in Figure 3 between the grid and cathode of tubes 23 and 24. In other words the resistance connection provided by resistor 48 between the junction of resistors 42 and 44 and the junction of resistors 46 and 47 results in the biasing action obtained with this modification.

If the values of resistances 42, 44 and 48 remain equal and constant in magnitude and resistances 46 and 47 remain equal but vary in magnitude the following would result. With decrease in value of resistances 46 and 47 the effect of the reference voltages of transformer secondary portions 28 and 29 and the signal voltage induced in transformer secondary 54 would decrease until such time as resistances 46 and 47 approach short circuit values. At this time the grids and cathodes would remain at the same potentials at all times no matter what reference voltage or signal voltage were induced into the circuit.

With increase in value of resistances 46 and 47 the reference voltage induced in the secondary portion 28 of transformer 20 would have less and less effect upon the voltage across resistance 47 as resistance 48 would assume more and more the characteristics of a short circuit connection in relation to resistances 44 and 47 parallel therewith. The effect of the reference voltage induced in secondary portion 29 would have a similar decreasing effect upon the voltage across resistance 46 with increased values of resistances 46 and 47. At such time as resistances 46 and 47 became infinite the voltage induced in transformer secondary portion 28 would have no effect upon the grid to cathode potential in tube 24. In this ultimate condition the operation of this circuit would be similar to the operation of that circuit shown in Figure 1.

If the values of resistances 48, 46 and 47 remain equal and constant in magnitude and the values of resistances 42 and 44 remain equal but varied in magnitude the following would result. With decreased values of resistances 42 and 44 the reference voltages in transformer secondary portions 28 and 29 and the signal voltage in transformer secondary 54 would have less and less effect upon the grid to cathode voltage in tubes 23 and 24. When the value of resistances 42 and 43 reached short circuit values the reference voltage and signal voltage would have absolutely no effect upon the grid to cathode potential in the tubes 23 and 24.

With increased values of resistances 42 and 44 the voltage induced in transformer secondary 28 would have less and less effect upon the voltage across resistance 47 as resistance 48 would assume short circuit characteristics in parallel with resistances 44 and 47. When the value of resistances 42 and 44 becomes infinite the voltage induced in transformer secondary 28 would have absolutely no effect upon the grid to cathode potential in tube 24.

The few equations given below are for the purpose of showing more exactly the effect the values of resistances 42, 44, 46, 47 and 48 have upon the grid voltage of tubes 23 and 24 wherein:

$E_s$ is the signal voltage
$E_B$ is the reference voltage
$e_{g_n}$ is the grid bias voltage when $E_s=0$
$r$ is the resistance of the transformer secondary winding portion plus the rectifier resistance in each half of the circuit of Figure 6 and is defined here as equal to unity.
$K_1r=K_1$ is the value of each of resistances 42 and 44
$K_2r=K_2$ is the value of each of resistances 46 and 47
$K_3r=K_3$ is the value of resistance 48
$e_{g_1}$ is the grid bias voltage on grid 27
$e_{g_2}$ is the grid bias voltage on grid 33
$e_1=E_B+E_s$ and $e_2=|E_B-E_s|$ Solving the circuits using Kirchoff's equations the grid bias voltages come out:

(1)
$$e_{g_1}=K_1K_2\frac{e_1[(1+K_1)(K_2+K_3)+K_1]-e_2K_3(1+K_1)}{[(+K_1)(K_2+K_3)+K_1]^2-[K_3(1+K_1)]^2}$$

(2)
$$e_{g_2}=K_1K_2\frac{e_2[(1+K_1)(K_2+K_3)+K_1]-e_1K_3(1+K_1)}{[(1+K_1)(K_2+K_3)+K_1]^2-[K_3(1+K_1)]^2}$$

When $E_B-E_s>0$ the first equation becomes:

(3) $e_{g_1}=$
$$K_1K_2\frac{E_B[K_2+K_1K_2+K_1]-E_s[(1+K_1)(K_2+2K_3)+K_1]}{[(1+K_1)(K_2+2K_3)+K_1][K_2+K_1K_2+K_1]}$$

When $E_s-E_B>0$ the equation (1) becomes:

(4) $e_{g_1}=$
$$K_1K_2\frac{E_s[K_2+K_1K_2+K_1]-E_B[(1+K_1)(K_2+2K_3)+K_1]}{[(1+K_1)(K_2+2K_3)+K_1][K_2+K_1K_2+K_1]}$$

Now when $E_s=0$ (5) $$e_{g_n}=e_{g_1}=e_{g_2}=K_1K_2\frac{E_B}{[(1+K_1)(K_2+2K_3)+K_1]}$$

or (6) $$E_B=\frac{e_{g_n}}{K_1K_2}[(1+K_1)(K_2+2K_3)+K_1]$$

When $E_B-E_s>0$ and $e_g=0$ (7) $$E_B[K_2+K_1K_2+K_1]-E_s[(1+K_1)(K_2+2K_3)+K_1]=0$$

Substituting into Equation 7 the expression for $E_B$ in Equation 6 and solving for $E_{s_0}$ which is now defined as that value of signal voltage which will make $e_g$ zero when $E_B-E_s>0$:

(8) $$E_{s_0}=e_{g_n}\left[\frac{K_1+K_2}{K_1K_2}+1\right]$$

From this expression it can be seen that the portion of the curve in Figure 8 wherein either tube 23 or 24 moves into the firing range is independent of the value of resistance 48 which is equal to $K_3$.

When $E_s-E_B>0$ the value of $e_g$ decreases until the tube is again biased below cutoff.

When $E_s-E_B>0$ and $e_g=0$ (9) $E_s[K_2+K_1K_2+K_1]-E_B[(1+K_1)(K_2+2K_3)+K_1]=0$ Substituting into Equation 9 the expression for $E_B$ in Equation 6 and solving for $E_{s_t}$ which is now defined as that value of signal voltage which will make $e_g$ zero when $E_s-E_B>o$:

$$(10)\quad E_{s_t}=e_{g_n}\left[\frac{K_1+K_2}{K_1K_2}+1\right]+e_{g_n}\left[\frac{4K_3(1+K_1)}{K_1K_2}\left(1+\frac{K_3(1+K_1)}{K_1+K_1K_2+K_2}\right)\right]$$

or $$(11)\quad E_{s_f}=E_{s_o}+e_{g_n}\left[\frac{4K_3(1+K_1)}{K_1K_2}\left(1+\frac{K_3(1+K_1)}{K_1+K_1K_2+K_2}\right)\right]$$

The following graph shows the change in $E_{s_o}$ and $E_{s_t}$ with changes in $K_1$, $K_2$, $K_3$ for $E_{g_n}=10$ volts.

| $K_1$ | $K_2$ | $K_3$ | $E_{s_o}$ (Volts) | $E_{s_t}$ (Volts) |
|---|---|---|---|---|
| 5 | 5 | 1 | 14 | 25 |
| 5 | 5 | 5 | 14 | 103 |
| 5 | 5 | 10 | 14 | 275 |
| 10 | 10 | 1 | 12 | 17 |
| 10 | 10 | 5 | 12 | 44 |
| 10 | 10 | 10 | 12 | 96 |
| 5 | 10 | 5 | 13 | 48 |
| 10 | 5 | 5 | 13 | 94 |

With the reference voltage and signal voltage positioned in the circuit as shown in Figure 6 the ripple voltages on the grids 27 and 33 of tubes 23 and 24 would be out of phase until such time as the signal voltage value in transformer secondary 54 would be equal to the reference voltage induced in each half 28 and 29 of transformer 20. Upon greater value of signal voltage than the value of reference voltage in each half 28 and 29 of transformer 20 the ripple voltages on the grids of the two tubes 23 and 24 would be in phase.

With the signal voltage and reference voltage position interchanged in the circuit the reverse would be true. That is, at signals up to twice the value of the reference voltage the ripple voltages on the grids 27 and 33 of tubes 23 and 24 respectively would be in phase. Upon signal values of more than twice the reference voltage values the ripple voltages on the grids would be out of phase.

At zero signal voltage the average ripple voltage values on the grids 27 and 33 of tubes 23 and 24 respectively would be the same. When a signal voltage is induced into transformer secondary 54, however, the amplitude of the direct voltage and the ripple voltage on one of the grids would decrease in value and the direct voltage and the ripple voltage on the other grid would increase in amplitude.

*Modification of Figure 7*

The modification shown in Figure 7 is similar to that modification shown in Figure 6. In Figure 7, however, a condenser 49 has been placed in parallel with resistance 48 and the signal voltage is fed between the center tap on the secondary of transformer 20 and ground. A resistance 37 has also been placed between the center tap on the secondary of transformer 20 and resistance 48. The condenser 49 which has been placed in parallel with resistance 48 is merely for the purpose of providing an A. C. short circuit to ground around resistance 48. The signal input circuit may be traced through condenser 65, connecting terminal 66, resistance 37, and condenser 49 to ground. Thus the entire signal voltage potential is generated across resistance 37. Operation of this circuit is identical with that circuit shown in Figure 6.

Figure 8 which has been previously explained in connection with the circuit disclosed in Figure 6 also shows graphically the change in grid voltage with respect to change in signal voltage in the circuit shown in Figure 7.

*Conclusion*

Although specific examples of the invention have been shown and described, it will be understood of course, that they are but illustrative and that various modifications may be made therein without departing from the scope and spirit of the invention as described in the appended claims.

I claim as my invention:

1. An electronic amplifier having in combination: a first and a second circuit each having an electron discharge device including an anode, control element and cathode, a source of alternating voltage, and a rectifier; means in each circuit electrically connecting said alternating voltage and rectifier in series with the control element and cathode of that circuit in such a manner that the potentials on said control elements are out of phase; a source of alternating voltage common to both of said circuits and connected into said circuits in such a manner as to add to the potential across the voltage source in one of said circuits and subtract from the potential across the voltage source in the other of said circuits, one of the two alternating voltages in each circuit being of constant magnitude and phase and the other of variable magnitude and phase; a resistance and capacitance network in each circuit electrically connected in parallel with the voltage sources and rectifier; means electrically connecting said cathodes; and means for applying a source of alternating voltage to said anodes in such a manner that the potentials on said anodes will be in phase.

2. An electronic amplifier having in combination: a first and a second circuit each having an electron discharge device including a control element and cathode, a source of alternating voltage and a rectifier in series therewith; a source of alternating voltage common to both of said circuits and connected into said circuits in such a manner as to add to the potential across the voltage source in one of said circuits and subtract from the potential across the voltage source in the other of said circuits, one of the two alternating voltages in each circuit being of constant magnitude and phase and the other of variable magnitude and phase; and means in each circuit electrically connecting said voltage sources and rectifier to the control element and cathode of that circuit through a resistance and capacitance network in such a manner that in the circuit wherein the variable voltage adds to the constant voltage an increase in magnitude of said variable voltage will increase the voltage difference between the control element and cathode to a predetermined maximum value.

3. An electronic amplifier having in combination: a first and a second circuit each having an electron discharge device including an anode, control element and cathode, a source of alternating voltage and a rectifier in series therewith; a resistance and capacitance network electrically connected in parallel with said voltage source and rectifier in each circuit; means electrically connecting said cathodes; a source of alternating voltage common to both of said circuits and connected into said circuits in such a manner as to add to the potential across the voltage source in one of said circuits and subtract from the potential across the voltage source in the other of said circuits, one of the two alternating voltages in each circuit being of constant magnitude and phase and the other of variable magnitude and phase; means electrically connecting said voltage sources and rectifier in series to the control element and cathode in each circuit in such a manner that the voltage sources unique to each circuit apply potentials of opposite polarity on the control elements and in the circuit wherein the variable voltage adds to the constant voltage an increase in magnitude of said variable voltage will increase the voltage difference between the control element and cathode to a predetermined maximum value; and means for applying a source of alternating voltage to said anodes in such a manner that the potentials on said anodes will be in phase.

4. An electronic circuit having in combination: a first source of alternating voltage of constant magnitude and phase; a second source of alternating voltage of the same frequency as the voltage of said first source but variable in magnitude and reversible in phase; a rectifier; an electron discharge device including a control element and a cathode; an impedance connected directly between said control element and cathode; and means electrically connecting said voltage sources and rectifier in a series circuit through all of said impedance to impress a voltage across said impedance of such polarity as to tend to cause said control element to be negative with respect to said cathode, the magnitude of said voltage impressed across said impedance being dependent upon the magnitude and phase of the voltage of said second source with respect to the voltage of said first source in such a manner that an increase in magnitude of the voltage of said second source increases the potential of the control element to a predetermined maximum value in the positive direction with respect to the potential of the cathode.

5. An electronic circuit having in combination: a first source of alternating voltage of constant magnitude and phase; a second source of alternating voltage of the same frequency as the voltage of said first source but variable in magnitude and reversible in phase; a rectifier; an electron discharge device including a control element and a cathode; a resistor and capacitor network connected directly between said control element and cathode; and means electrically connecting said voltage sources and rectifier in a series circuit through all of said network to impress a voltage across said network of such polarity as to tend to cause said control element to be negative with respect to said cathode, the magnitude of said voltage impressed across said network being dependent upon the magnitude and phase of the voltage of said second source with respect to the voltage of said first source in such a manner that an increase in magnitude of the voltage of said second source increases the potential of the control element to a predetermined maximum value in the positive direction with respect to the potential of the cathode.

6. An electronic amplifier having in combination: a first and a second circuit each having a source of alternating voltage, a rectifier, a discharge device having a control element and a cathode, a resistance, and a capacitance in parallel with said resistance; a source of alternating voltage common to both of said circuits and connected into said circuits in such a manner as to add to the potential across the voltage source in one of said circuits and subtract from the potential across the voltage source in the other of said circuits; means electrically connecting said resistance and capacitance across the voltage sources and rectifier in each circuit; and means in each circuit electrically connecting the voltage sources, rectifier, control element and cathode in series in such a manner that in the circuit wherein the two voltages add an increase in magnitude of one of the voltages will increase the voltage difference between the control element and cathode to a predetermined maximum value.

7. An electronic control circuit having in combination: a first and a second electron discharge device each including a control element and cathode; an impedance network comprising a resistance electrically connected between the control elements of said discharge devices, a tapped resistance electrically connected between the control elements of said discharge devices, and condensers electrically connected across each portion of said tapped resistance; a pair of rectifiers; a tapped alternating voltage source electrically connected through said rectifiers to the control elements of said discharge devices; an alternating voltage source electrically connected between taps on said tapped voltage source and said tapped resistance in such a manner as to subtract from one portion of the potential of said tapped voltage source and add to the other portion of the potential of said tapped voltage source; and means including said impedance network for impressing the two portions of added voltages onto the control element and cathode of one of said discharge devices in such a manner as to cause said discharge device to be operative.

8. An electronic control circuit having in combination: a first and a second electron discharge device each including a control element and cathode; an impedance network comprising a first tapped resistance electrically connected between the control elements of said discharge devices, a second tapped resistance electrically connected between the control elements of said discharge devices, and condensers electrically connected across each portion of said second tapped resistance; means electrically connecting the cathodes of said discharge devices; a voltage source electrically connected between a tap on said first tapped resistance and the cathodes of said discharge devices to bias the control elements of said discharge devices inoperative at a zero signal; a pair of rectifiers; a tapped alternating voltage source electrically connected through said rectifiers to the control elements of said discharge devices; an alternating voltage source electrically connected between taps on said tapped voltage source and said second tapped resistance in such a manner as to subtract from one portion of the potential of said tapped voltage source and add to the other portion of the potential of said tapped voltage source, one of said voltages being of constant magnitude and phase and the other a signal voltage of variable magnitude and phase; and means, including said impedance network, for impressing the two portions of added voltages onto the control element and cathode of one of said discharge devices in such a manner that upon increase in magnitude of the variable voltage the voltage between the control element and cathode of the discharge device will increase to a maximum predetermined value.

9. An electronic control circuit having in combination: a first and a second electron discharge device each including a control element and cathode; an impedance network comprising a first tapped resistance electrically connected between the control elements of said discharge devices, a second tapped resistance electrically connected between the control elements of said discharge devices, a third resistance electrically connected to taps on said first and second resistances, and condensers electrically connected across each portion of said second resistance; means electrically connecting the cathodes of said discharge devices; a pair of rectifiers; a tapped alternating voltage source electrically connected through said rectifiers to the control elements of said discharge devices; an alternating voltage source electrically connected between taps on said tapped voltage source and said second resistance in such a manner as to subtract from one portion of the potential of said tapped voltage source and add to the other portion of the potential of said tapped voltage source, one of said voltages being of constant magnitude and phase and the other a signal voltage of variable magnitude and phase; and means including said impedance network, for impressing the two voltages onto the control element and cathode of each of said discharge devices in such a manner that upon increase in magnitude of the variable voltage the voltage between the control element and cathode of one of said discharge devices will increase to a maximum predetermined value.

10. An electronic control circuit having in combination: a first and a second thyratron each including a control element and cathode; a pair of rectifiers; a tapped alternating voltage source electrically connected through said rectifiers to the control elements of said discharge devices; an impedance network comprising a first tapped resistance electrically connected between the control elements of said discharge devices, a second tapped resistance electrically connected between the control elements of said discharge devices, condensers electrically connected across each portion of said second resistance, a third resistance electrically connected to taps on said first and second resistances, and a fourth resistance electrically connected between taps on said second resistance and said voltage source; means electrically connecting the cathodes of said discharge devices; an alternating voltage impressed between a tap on said tapped voltage source and said cathodes in such a manner as to subtract from one portion of the potential of said tapped voltage source and add to the other portion of the potential of said tapped voltage source, one of said voltages being of constant magnitude and phase and the other a signal voltage of variable magnitude and phase; and means, including said impedance network, for impressing the two voltages onto the control element and cathode of each of said discharge devices in such a manner that upon increase in magnitude of the variable voltage the voltage between the control element and cathode of one of said discharge devices will increase to a maximum predetermined value.

11. An electronic control circuit having in combination: a thyratron including a control element and cathode; an impedance network comprising a first resistance electrically connected between the control element and cathode of said discharge device, a second resistance electrically connected in parallel with said first resistance, a third resistance electrically connected between the cathode of said discharge device and said second resistance, and a condenser electrically connected across said second resistance; a first and a second alternating voltage source, one of said voltage sources being of constant magnitude and phase and the other a signal voltage source of variable magnitude and phase; a rectifier; and means electrically connecting said voltage sources through said rectifier and impedance network to the control element and cathode of said discharge device in such a manner that the voltages from said voltage sources add and an increase in magnitude of said variable voltage will increase the potential difference between the control element and cathode of said discharge device and render said discharge device operative.

12. An electronic control circuit having in combination: a thyratron including a control element and cathode; an impedance network comprising a first resistance having a portion thereof electrically connected between the control element and cathode of said discharge device, a second resistance electrically connected in parallel with said first resistance, a condenser electrically connected across a portion of said second resistance, a third resistance electrically connected between the cathode of said discharge device and that side of the condenser electrically connected between the terminals of said second resistance, a first alternating voltage source of constant magnitude and phase and a second alternating signal voltage source of variable magnitude and phase; a rectifier; and means electrically connecting said voltage sources through said rectifier and impedance network to the control element and cathode of said discharge device in such a manner that the voltages from said voltage sources add and an increase in magnitude of said variable voltage will increase the potential difference between the control element and cathode of said discharge device and render said discharge device operative.

13. An electronic amplifier having in combination: a discriminator circuit containing a pair of electron discharge devices, each having a control electrode; a source of constant voltage; a source of variable voltage; means electrically connecting said sources to said circuit in such a manner that an increase in voltage from said variable source causes an increase in voltage on the control electrode of one of the discharge devices to a peak value and would normally tend to cause a similar rate of decrease in voltage on the control electrode upon a further increase in said variable voltage; and means for inhibiting the rate of decrease in voltage on the control electrode.

14. An electronic amplifier having in combination: a discriminator circuit containing a pair of thyratrons, each having a control element; a source of constant voltage and a source of variable voltage, one of which is center-tapped; means connecting the other of said sources to the center-tap of the one of said sources; a parallel resistance and capacitance network electrically connected across each half of the center-tapped source and the entire other source in series therewith; means electrically connecting said sources and said networks to said circuit in such a manner that an increase in voltage from said variable source causes an increase in voltage on the control electrode of one of the discharge devices to a peak value and would normally tend to cause a similar rate of decrease in voltage on the control electrode upon a further increase in said variable voltage; and means for inhibiting the rate of decrease in voltage on the control electrode.

15. An electronic amplifier having in combination: a discriminator circuit containing a pair of thyratrons, each having a control element; a source of constant voltage and a source of variable voltage, one of which is center-tapped; means connecting the other of said sources to the center-tap of the one of said sources; a parallel resistance and capacitance network electrically connected across each half of the center-tapped source and the entire other source in series therewith; means electrically connecting said sources and said networks to said circuit in such a manner that an increase in voltage in the positive direction from said variable source causes an increase in voltage in the positive direction on the control electrode of one of the discharge devices to a peak value and would normally tend to cause a similar rate of decrease in voltage on the control electrode upon a further increase in said variable voltage; and means for inhibiting the rate of decrease in voltage on the control electrode.

16. An electronic amplifier having in combination: a discriminator circuit containing a pair of thyratrons, each having a control element; a source of constant voltage and a source of variable voltage, one of which is center-tapped; means connecting the other of said sources to the center-tap of the one of said sources; a parallel resistance and capacitance network electrically connected across each half of the center-tapped source and the entire other source in series therewith; means electrically connecting said sources and said networks to said circuit in such a manner that an increase in voltage in the positive direction from said variable source to such a value that the voltage across one half the center-tapped source equals the voltage across the other source causes an increase in voltage in the positive direction on the control electrode of one of the discharge devices to a peak value and would normally tend to cause a similar rate of decrease in voltage on the control electrode upon a further increase in said variable voltage; and means for inhibiting the rate of decrease in voltage on the control electrode.

17. An electronic amplifier having in combination: a discriminator circuit containing a pair of thyratrons, each having a control element; a source of constant voltage and a source of variable voltage, one of which is center-tapped; means connecting the other of said sources to the center tap of the one of said sources; a parallel resistance and capacitance network electrically connected across each half of the center-tapped source and the entire other source in series therewith; means electrically connecting said sources and said networks to said circuit in such a manner that an increase in voltage in the positive direction from said variable source to such value that the voltage across one half the center-tapped source equals the voltage across the other source causes an increase in voltage in the positive direction on the control electrode of one of the discharge devices to a peak value and would normally tend to cause a similar rate of decrease in voltage on the control electrode upon a further increase in said variable voltage; and resistance means electrically connected across said networks for inhibiting the rate of decrease in voltage on the control electrode.

DAVID L. MARKUSEN.

REFERENCES CITED

The following references are of record in the file of this patent:

UNITED STATES PATENTS

| Number | Name | Date |
|---|---|---|
| 2,259,289 | Blumentritt | Oct. 14, 1941 |
| 2,384,380 | Isserstedt | Sept. 4, 1945 |
| 2,405,694 | Herzmark | Aug. 13, 1946 |
| 2,409,970 | Agins | Oct. 22, 1946 |
| 2,449,859 | Penfold et al. | Sept. 21, 1948 |